United States Patent
Hikake et al.

(10) Patent No.: US 6,993,825 B2
(45) Date of Patent: Feb. 7, 2006

(54) TILT ADJUSTING METHOD FOR GUIDE SHAFTS IN A RECORDING MEDIUM DRIVING APPARATUS

(75) Inventors: Kazuhisa Hikake, Tokyo (JP); Tomoyasu Takaoka, Tokyo (JP); Shigeki Fujibayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 10/362,211

(22) PCT Filed: Aug. 29, 2002

(86) PCT No.: PCT/JP02/08750

§ 371 (c)(1),
(2), (4) Date: Aug. 12, 2003

(87) PCT Pub. No.: WO03/018343

PCT Pub. Date: Mar. 6, 2003

(65) Prior Publication Data

US 2004/0032817 A1   Feb. 19, 2004

(30) Foreign Application Priority Data

Aug. 31, 2001  (JP)  .......... P 2001-264545

(51) Int. Cl.
    G11B 5/127   (2006.01)
    H04R 31/00   (2006.01)
(52) U.S. Cl. ............ 29/603.1; 29/603.03; 29/603.07; 29/603.09; 369/53.19; 369/213; 369/219
(58) Field of Classification Search ............ 29/603.03, 29/603.09, 603.1; 369/53.19, 213, 219
See application file for complete search history.

(56) References Cited

U.S. PATENT DOCUMENTS 4,731,920 A * 3/1988 Nishijima et al. ....... 29/603.06

(Continued)

FOREIGN PATENT DOCUMENTS

JP   11-25466   1/1999

(Continued)

OTHER PUBLICATIONS

"A simple detection method for RLL codes (Run detector) [magneto-optical disk systems]"; Nakagawa, T.; Ino, H.; Shimpuku, Y.; Magnetics, IEEE Transactions on vol. 33, Issue 5, Sep. 1997; p.: 3262-3264.*

*Primary Examiner*—A. Dexter Tugbang
*Assistant Examiner*—Paul D. Kim
(74) *Attorney, Agent, or Firm*—Oblon, Spivak, McClelland, Maier & Neustadt, P.C.

(57) ABSTRACT

A tilt adjusting method for a recording medium driving apparatus including a linear driving device including first and second parallel guide shafts. The method provides a flat mirror on a turntable, an auto-collimator, and a skew angle adjusting jig including an optically flat surface. In a first state of the jig, a height of the second end of the first shaft is adjusted so that a tilt of the first shaft in a radial direction matches a tilt of the mirror, and a height of the first end of the second shaft is adjusted so that a tilt of the first shaft in a tangential direction matches the tilt of the mirror. And, in a second state of the jig, a height of the second end of the second shaft is adjusted so that a tilt of the second shaft in a radial direction matches the tilt of the mirror.

10 Claims, 14 Drawing Sheets

U.S. PATENT DOCUMENTS 5,361,181 A * 11/1994 Kurata ............... 360/99.02
6,175,544 B1 * 1/2001 Shiomi ................ 720/674
6,754,154 B1 * 6/2004 Takeda et al. ........ 369/53.19

FOREIGN PATENT DOCUMENTS

JP    2000132842 A  *  5/2000
JP    2002-74683        3/2002

* cited by examiner

US 6,993,825 B2

TILT ADJUSTING METHOD FOR GUIDE SHAFTS IN A RECORDING MEDIUM DRIVING APPARATUS

TECHNICAL FIELD

The present invention relates to a tilt adjusting method for guide shafts in a recording medium driving apparatus, such as an optical disc driving apparatus.

BACKGROUND ART

A variety of optical disc driving apparatuses have been conventionally proposed for handling optical discs such as CDs (Compact Discs) and DVDs (Digital Versatile Discs).

The inventors of the present invention have conceived a recording medium driving apparatus that includes at least a turntable for rotationally driving a recording medium that has been mounted, a spindle motor for driving this turntable, a head apparatus for performing recording and/or reproduction for this recording medium, and a linear driving means for driving this head apparatus in a straight line. This linear driving apparatus includes at least a nut to which the head apparatus is attached, a feed screw onto which the nut is screwed, a feed motor for driving the feed screw, and first and second guide shafts that are disposed parallel to one another on both sides of the head apparatus and guide the head apparatus.

With such a recording medium driving apparatus, it is necessary to adjust the tilt of the first and second guide shafts so as to precisely adjust the parallelism between a plane that is perpendicular to the optical axis of the head apparatus and a plane on which the recording medium is mounted on the turntable.

SUMMARY OF THE INVENTION

In view of the above problems, the present invention proposes a tilt adjusting method for adjusting guide shafts in a recording medium driving apparatus that includes at least a turntable for rotationally driving a recording medium that has been mounted, a spindle motor for driving the turntable, a head apparatus for performing recording and/or reproduction for the recording medium, and linear driving means for moving the head apparatus in a straight line, the linear driving means including at least a nut that is attached to the head apparatus, a feed screw onto which the nut is screwed, a feed motor for driving the feed screw, and first and second guide shafts that are disposed parallel to one another on both sides of the head apparatus and guide the head apparatus, the tilt adjusting method making it possible to precisely adjust the parallelism between a plane of a turntable on which a recording medium is mounted and a plane that is perpendicular to the optical axis of the head apparatus.

The present invention is a tilt adjusting method for a recording medium driving apparatus, the recording medium driving apparatus including at least a turntable for rotationally driving a recording medium that has been mounted, a spindle motor for driving the turntable, a head apparatus for performing recording and/or reproduction for the recording medium, and linear driving means for moving the head apparatus in a straight line, the linear driving means including at least a nut that is attached to the head apparatus, a feed screw onto which the nut is screwed, a feed motor for driving the feed screw, and first and second guide shafts that are disposed parallel to one another on both sides of the head apparatus and guide the head apparatus, the tilt adjusting method (i) providing, on a surface of the turntable on which the recording medium is mounted, a reflective substrate including a flat mirror that is parallel with and above the surface, (ii) using a skew angle adjusting jig and an auto-collimator, the skew angle adjusting jig including an optically flat substrate with an optically flat surface and three mounting surfaces that are parallel with the optically flat surface, and (iii) comprising a first step and a second step, wherein in a state where two mounting surfaces out of the three mounting surfaces of the skew angle adjusting jig are mounted onto both ends of the first guide shaft and a remaining mounting surface is mounted on one end of the second guide shaft, the first step shines a parallel beam from the auto-collimator in a perpendicular state onto both the flat mirror, which is rotated by the turntable, and onto the optically flat surface, has reflected light from the flat mirror and reflected light from the optically flat surface return to the auto-collimator, adjusts, with a height of one end of the first guide shaft as a standard, a height of another end of the first guide shaft so that a tilt of the first guide shaft in the radial direction matches the tilt of the flat mirror, and next adjusts, with a height of the first guide shaft as a standard, a height of one end of the second guide shaft so that a tilt of the first guide shaft in the tangential direction matches the tilt of the flat mirror, and in a state where two mounting surfaces out of the three mounting surfaces of the skew angle adjusting jig are mounted onto both ends of the second guide shaft and a remaining mounting surface is mounted on one end of the first guide shaft, the second step shines a parallel beam from the auto-collimator in a perpendicular state onto both the flat mirror, which is rotated by the turntable, and onto the optically flat surface, has reflected light from the flat mirror and reflected light from the optically flat surface return to the auto-collimator, and adjusts, with a height of one end of the second guide shaft as a standard, a height of another end of the second guide shaft so that a tilt of the second shaft in the radial direction matches the tilt of the flat mirror.

The present invention provides, on a surface of the turntable on which the recording medium is mounted, a reflective substrate including a flat mirror that is parallel with and above the surface, uses a skew angle adjusting jig and an auto-collimator, the skew angle adjusting jig including an optically flat substrate with an optically flat surface and three mounting surfaces that are parallel with the optically flat surface, and comprises a first step and a second step. In the first step, in a state where two mounting surfaces out of the three mounting surfaces of the skew angle adjusting jig are mounted onto both ends of the first guide shaft and a remaining mounting surface is mounted on one end of the second guide shaft, a parallel beam from the auto-collimator is shone in a perpendicular state onto both the flat mirror, which is rotated by the turntable, and onto the optically flat surface, reflected light from the flat mirror and reflected light from the optically flat surface are returned to the auto-collimator, a height of one end of the first guide shaft is adjusted, with a height of another end of the first guide shaft as a standard, so that a tilt of the first guide shaft in the radial direction matches the tilt of the flat mirror, and then a height of one end of the second guide shaft is adjusted, with a height of the first guide shaft as a standard, so that a tilt of the first guide shaft in the tangential direction matches the tilt of the flat mirror. In the second step, in a state where two mounting surfaces out of the three mounting surfaces of the skew angle adjusting jig are mounted onto both ends of the second guide shaft and a remaining mounting surface is mounted on one end of the first guide shaft, a parallel beam is shone from the auto-collimator in a perpendicular state onto both the flat mirror, which is rotated by the turntable, and onto the optically flat surface, reflected light from the flat mirror and reflected light from the optically flat surface are returned to the auto-collimator, and a height of one end of the second guide shaft is adjusted with a height of the other end of the second guide shaft as a standard so that a tilt of the second shaft in the radial direction matches the tilt of the flat mirror.

BRIEF DESCRIPTION OF THE DRAWINGS

FIG. 17B is a side view showing one example of a height adjusting means for both ends of the main guide shaft 32a.

BEST MODE FOR CARRYING OUT THE PRESENT INVENTION

Figure 1:
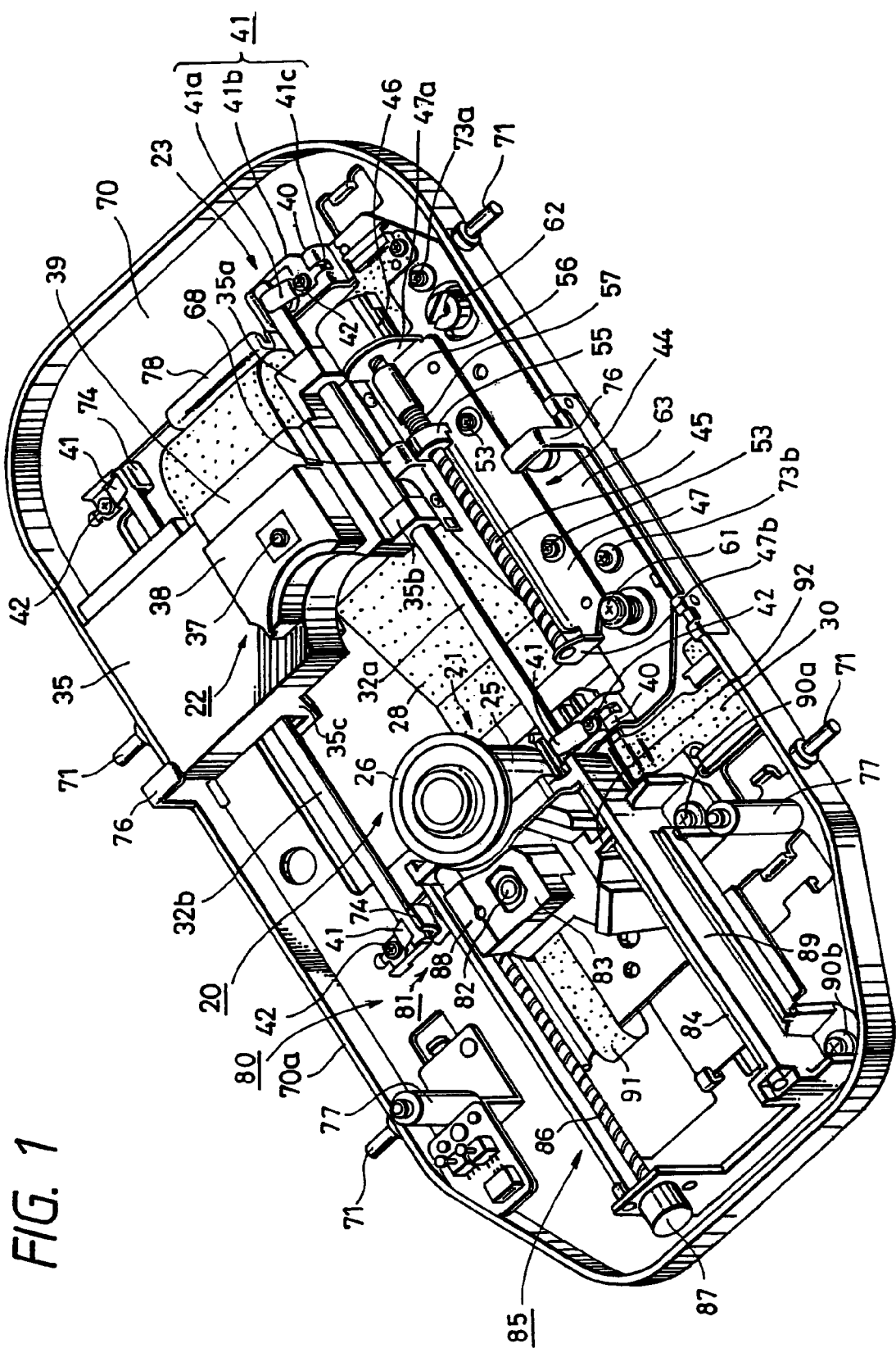
FIG. 1 is a perspective view showing one example of a recording medium driving apparatus according to an embodiment of the present invention.
Figure 2:
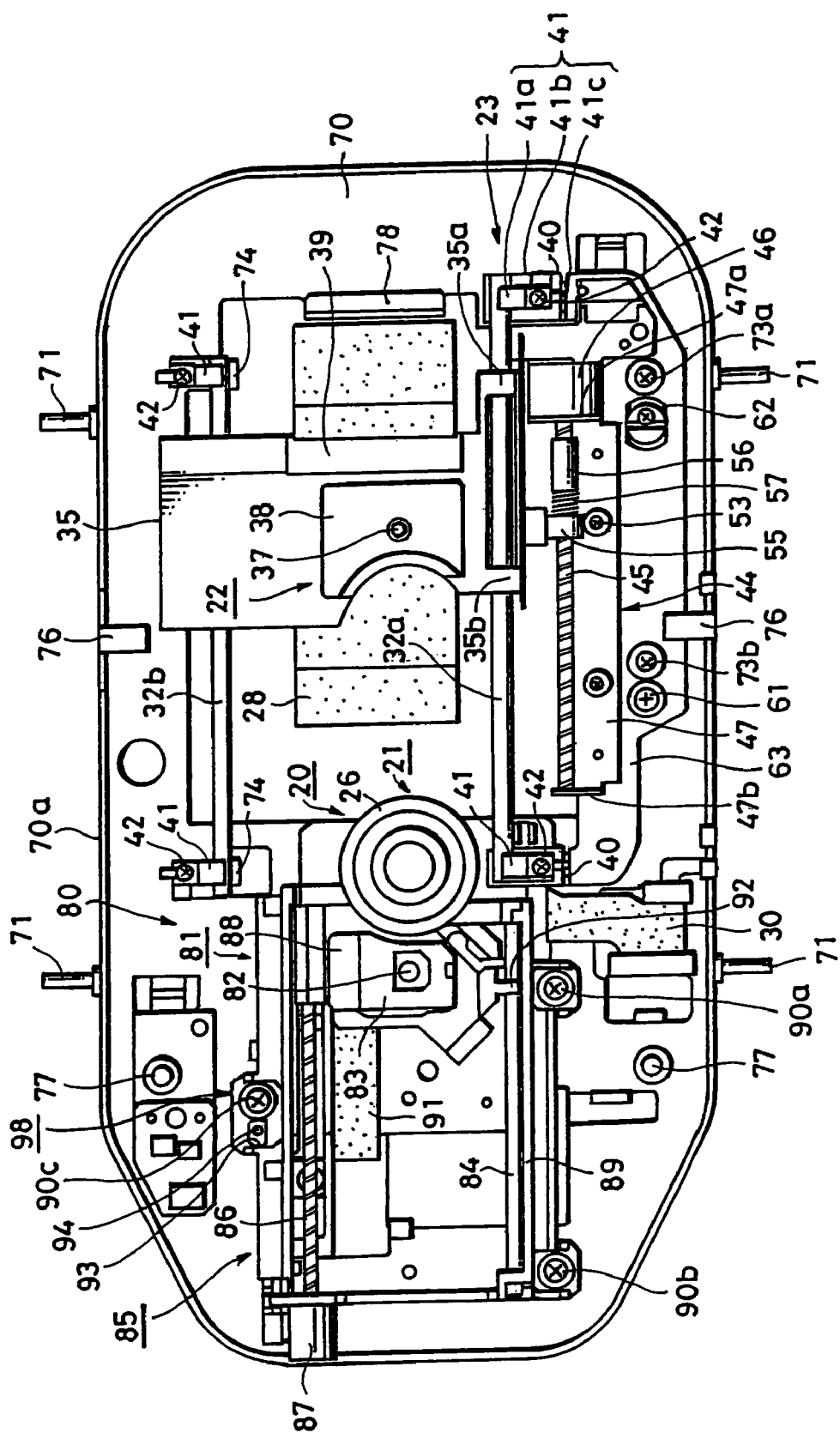
FIG. 2 is a plan view showing one example of a recording medium driving apparatus according to an embodiment of the present invention.

The following describes a tilt adjusting method for guide shafts in a recording medium driving apparatus according to the present invention using an example that is applied to a tilt adjusting method for guide shafts in an optical disc driving apparatus. First, however, an example of an optical disc driving apparatus is described with reference to FIGS. 1 to 10. FIGS. 1 and 2 are respectively a perspective view and a plan view that show the overall construction of this optical disc driving apparatus that will be described below. In the drawings, reference numeral 70 denotes a metal chassis. A reinforcing rib 70a is integrally formed with the chassis 70 around the edge of the chassis 70.

In FIGS. 1 and 2, reference numeral 20 denotes the entire disc driving apparatus, which includes: a table driving apparatus 21 that rotationally drives an optical disc at a predetermined velocity (for example, a constant linear velocity); a first optical head apparatus 22 that performs reads and writes of information signals such as image data and audio data; a second optical head apparatus 81 that performs reads of information signals such as image data and audio data; an optical head driving apparatus (linear driving means) 23 that moves the first optical head apparatus 22 back and forth in a straight line relative to the table driving apparatus 21, and an optical head driving apparatus (linear driving means) 80 that moves the second optical head apparatus 81 back and forth in a straight line relative to the table driving apparatus 21.

The table driving apparatus 21 includes a spindle motor 25, a turntable 26 that is fixed to an end part of a rotational shaft of the spindle motor 25, and a chucking plate or the like (not shown in the drawing) that holds the optical disc onto the turntable 26. The spindle motor 25 is attached to an upper surface of a motor baseplate (not shown in the drawing) that is made of a thin metal plate. This motor baseplate is attached onto the chassis 70.

Reference numeral 28 denotes a flexible circuit board that is connected to the first optical head apparatus 22. When part of the flexible circuit board 28 extends below the chassis 70 through a hole provided in the chassis 70, to avoid damage to the flexible circuit board 28 caused by the flexible circuit board 28 coming into contact with the right-angled parts of the edges of the hole, the edges of the hole in the chassis 70 are partially bent to form a bent part 78, so that the flexible circuit board 28 instead comes into contact with the curved surfaces of this bent part 78.

The spindle motor 25 has a fixed part that is fixed to the motor baseplate and a rotating part that is supported by the fixed part so as to be freely rotatable. The turntable 26 is fitted onto the rotational shaft that is the center of rotation of the rotating part by a fixing means, such as forced insertion, and so is integrated with the spindle motor 25.

The first and second optical head apparatuses 22 and 81 are provided on the chassis 70 on both sides of the table driving apparatus 21. In this case, the first optical head apparatus 22 is an optical head apparatus that can optically write and read data, such as audio data and audio data, on a recordable disc (called a "DVR", for example), and uses a blue laser diode as a laser light source so that high-density writes and reads can be performed. Such DVR is enclosed in a cartridge which is supported by a pair of cartridge supporting members 76 that are integrally formed with the reinforcing rib 70*a* and a pair of cartridge supporting pins 77 that are embedded upright in the chassis 70, with the disc itself being attached to the turntable 26.

The second optical head apparatus 81 is an optical head apparatus that can optically reproduce data, such as image data and audio data, from optical discs that satisfy the DVD (Digital Versatile Disc) and CD (Compact Disc) standards. As a laser light source for such reads, the second optical head apparatus 81 uses a red and/or infrared laser diode.

First, the first optical head apparatus 22 and various related means will be described. A pair of guide shafts (a main and sub guide shaft) 32*a*, 32*b* are provided on both sides of the spindle motor 25 and are disposed approximately parallel to one another. This pair of guide shafts 32*a*, 32*b* is formed of cylindrical members whose outer circumferential surfaces are smooth. The main guide shaft 32*a* is supported at both ends by shafts 48 (see FIGS. 7 and 9) that will be described later, with the height of the main guide shaft 32*a* being adjusted by these shafts 48. The sub guide shaft 32*b* is supported at both ends by feed screws 60 (see FIGS. 8 and 10) that will be described later, with the height of the sub guide shaft 32*b* also being adjusted by the feed screws 60.

A rotating plate 63 is screwed onto the chassis 70 by screws 73*a*, 73*b*, and can be rotated by a minute angle by a rotational driving means 62, which will be described later, about a rotational center determining means 61, which will also be described later. By rotating this rotating plate 63, the direction of movement of the first optical head apparatus 22 by a linear driving means can be adjusted so as to match a predetermined radial direction with respect to the rotational center axis of the turntable 26.

A straight line that joins the rotational center determining means 61 and the rotational driving means 62 is approximately parallel to the predetermined radial direction for the rotational center axis of the turntable 26. The rotational center determining means 61 is attached to the rotating plate 63 and the chassis 70 so that the rotational center determining means 61 is located at a predetermined position close to the turntable 26. The rotational driving means 62 is attached to the rotating plate 63 so that the rotational driving means 62 is located at a predetermined position far from the turntable 26. The range of the rotational angle and precision of the rotational angle of the rotating plate 63 due to the rotation of the rotational driving means 62 are determined according to the positions of and distance between the rotational center determining means 61 and the rotational driving means 62.

The first optical head apparatus 22 is supported by this pair of guide shafts 32*a*, 32*b* so that the first optical head apparatus 22 can move back and forth in a straight line so as to move closer to and further away from the turntable 26. One end of each of the guide shafts 32*a*, 32*b* is disposed on each side of the spindle motor 25, while the other ends of the guide shafts 32*a*, 32*b* extend away from the spindle motor 25 so that the guide shafts 32*a*, 32*b* are approximately parallel.

The first optical head apparatus 22 is attached on a slide member 35 that is guided by the pair of guide shafts 32*a*, 32*b*, and is moved reciprocally. The slide member 35 is large enough to straddle the pair of guide shafts 32*a*, 32*b*, and is formed in the shape of a block to improve its rigidity. On one side of the slide member 35 in the longitudinal direction, shaft bearings 35*a*, 35*b* that form a pair are provided in a width direction that is perpendicular to the longitudinal direction. The main guide shaft 32*a* is inserted through these shaft bearings 35*a*, 35*b* so as to be freely slidable.

An L-shaped sliding engagement hook 35*c*, through which the sub guide shaft 32*b* is inserted so as to be freely slidable, is provided on the other side of the slide member 35 in the longitudinal direction. In addition, the sliding engagement hook 35*c* is formed so as to be wide in the horizontal direction and so is constructed so that the sub guide shaft 32*b* can be slightly tilted with respect to the width direction of the slide member 35. Accordingly, in this example, even when the pair of guide shafts 32*a*, 32*b* are not parallel and so are aligned at a slight angle to one another, the slide member 35 can still slide smoothly guided by the main guide shaft 32*a*.

The sub guide shaft 32*b* is suspended between a pair of shaft support plate 74, 74 that are provided on the chassis 70, with both ends of the sub guide shaft 32*b* being fixed and positioned at predetermined positions by shaft pressing plates 41 that are composed of plate springs and press upon the sub guide shaft 32*b*. Each shaft support plate 74 is formed by cutting and bending upwards part of the chassis 70, and by screwing the shaft pressing plates 41 directly onto the chassis 70, the sub guide shaft 32*b* can be fixed and positioned at a predetermined position on the chassis 70.

The first optical head apparatus 22 is composed of a biaxial actuator, which includes an objective lens 37, and an optical control unit or the like, which includes a photoelectric conversion element or the like and a laser diode for recording and reproducing information signals such as image data and audio data via the biaxial actuator. The majority of the biaxial actuator is covered by a head cover 38, with the objective lens 37 being exposed via an opening provided in the head cover 38. The objective lens 37 of the first optical head apparatus 22 faces an information recording surface of the optical disc attached to the turntable 26. An optical head connector 39 that is attached to an upper surface of the slide member 35 is electrically connected to the optical control unit. The flexible circuit board 28 mentioned above is connected to this connector 39.

Out of the pair of guide shafts 32*a*, 32*b*, the main guide shaft 32*a* is supported by a pair of shaft support plates 40, 40 that are provided on the rotating plate 63. These shaft support plates 40, 40 project from the main part of the rotating plate 63 in the form of arms. The rotating plate 63 is formed from a long, slender plate-like member that is made of a metal plate and has approximately the same length as the main guide shaft 32*a*. At both ends of the rotating plate 63 in the longitudinal direction, the shaft support plates 40, 40 are provided so as to project upwards on the same side in the width direction that is perpendicular to the longitudinal direction. Each of the shaft support plates 40, 40 has a base part that is bent in the shape of a crank and has an end that is raised upwards. As a result, L-shaped shaft support parts that are raised to a predetermined height from the support surface are formed at the free ends of the shaft support plates 40.

Both ends of the main guide shaft 32*a* are mounted upon and positioned by these shaft support parts of the pair of shaft support plates 40, 40 that have the shape described above. Both ends of the first guide shaft 32*a* are pressed upon and fixed by shaft pressing plates 41 that are screwed onto the shaft support plates 40 using fixing screws 42. Each shaft pressing plate 41 includes a pressing plate 41*a* that presses an end of the first guide shaft 32*a* in a radial direction, a stopper plate 41*b* that is in contact with the end of the first guide shaft 32*a* and stops the first guide shaft 32*a* from moving in the axial direction, and an engaging plate 41*c* that stops rotational displacement of the shaft pressing plate 41. Each shaft pressing plate 41 is formed of a plate spring that has an appropriate degree of elasticity.

A through-hole through which a fixing screw 42 passes is provided in approximately the center of each shaft pressing plate 41, with the pressing plate 41*a* being disposed on both sides of the through-hole so as to project outwards in one direction and the engaging plate 41*c* being disposed so as to project outwards in another direction. A stopper plate 41*b* is disposed in approximately the center of each shaft pressing plate 41 so as to project in a direction that is perpendicular to a direction in which the pressing plate 41*a* and the engaging plate 41*c* are joined. The end of the stopper plate 41*b* is bent so as to project on the pressing plate 41*a* side, with the tip being bent upwards so as to contact the end surface of the main guide shaft 32*a*. Each engaging plate 41*c* engages a concave part provided in a shaft support plate 40, so that the shaft pressing plate 41 does not rotate, even when a large force acts on the stopper plate 41*b* from the main guide shaft 32*a*. It should be noted that the pair of shaft pressing plates 41, 41 are formed with left-right symmetry.

The rotating plate 63 that has the construction described above is attached to the chassis 70 so as to be freely rotatable. The sub guide shaft 32*b* is directly attached to the pair of shaft pressing plates 41 provided on the chassis 70 using the pair of shaft pressing plates (plate springs) 41, 41 that are screwed onto the chassis using the fixing screws 42, 42.

The following describes a feed screw driving apparatus 44 that is attached to the rotating plate 63. This feed screw driving apparatus 44 includes a feed screw 45, a feed motor 46, a support plate 47, and a feed nut (described later) as a power transmission member. The support plate 47 is attached to the rotating plate 63 by screws 53, 53. The feed screw 45 is formed by providing a single screw thread that extends in a spiral across approximately the entire length in the axial direction of the outer circumferential surface of a cylindrical bar that is slightly shorter than the pair of guide shafts 32*a*, 32*b*. The screw thread of the feed screw 45 should favorably be formed with a trapezoidal cross-section where both side surfaces of the thread are angled slightly, though a square thread that is square in cross-section may also be used. A semicircular screw thread with a semicircular cross-section may also be used, as may any other conventional form of screw thread. In the present embodiment, the feed screw 45 is formed as a right-hand screw, though it should be obvious that a left-hand screw may be used.

The feed screw 45 doubles as the rotational shaft of the feed motor (electric motor) 46 that is the driving source, and is rotationally driven directly by the feed motor 46. The case of the feed motor 46 is fixed to and integrally formed with a motor support plate of the support plate 47 by a fixing means, such as crimping.

The feed nut, which represents a specific example of the power transmission member mentioned above, converts the rotational force of the feed screw 45 into linear motion that is transmitted to the slide member 35, and is composed of a first nut member 55 and a second nut member 56. A coil spring 57, which is an elastic body in the form of a coil and is a specific example of an elastic member, is present between the first nut member 55 and the second nut member 56. The spring force of the coil spring 57 energizes the nut members 55, 56 in opposite directions, and so absorbs any play in the axial direction that is produced between the feed nut (the first number member) 55 and the feed screw 45.

A protrusion bearing member 68 that is fixed to the slide member 35 engages a driving protrusion (not shown in the drawing) provided on the first nut member 55, with the locomotive force of the feed nut (the first nut member) 55 being transmitted via this protrusion bearing member 68 to the slide member 35.

Stainless steel plate is one example of a favorable material for the rotating plate 63 and the support plate 47, though it should be obvious that metal plates aside from steel plate may be used, as may an engineering plastic of sufficient strength. A metal material, such as stainless steel, that is rustproof and has sufficient strength is favorably used as the material for the feed screw 45. As one example, stainless steel with a high degree of elasticity can be used as a favorable material for the protrusion bearing member 68, though other plate-like materials may also be used.

The pair of guide shafts 32*a*, 32*b* described above, the rotating plate 63, and the feed screw driving apparatus 44 compose an optical head driving apparatus 23 that moves the first optical head apparatus 22 on a straight line towards and away from the turntable 26.

The following describes, with reference to FIGS. 1 and 2, the second optical head apparatus 81 and the various means that are related to the second optical head apparatus 81. Reference numeral 89 is an optical head attaching member (constructed of a plastic material, for example), with this optical head attaching member 89 being attached to the chassis 70 by attaching screws 90*a*, 90*b*, and 90*c*, though by moving this optical head attaching member 89 slightly with respect to the chassis 70, the direction in which the second optical head apparatus 81 is moved by a linear driving means (described later) can be adjusted so as to match a predetermined radial direction with respect to the rotational center axis of the turntable 26.

The second optical head apparatus 81 shares the table driving apparatus 21 that was described with reference to the first optical head apparatus 22. A guide shaft 84 and a feed screw 86 are disposed approximately parallel with each other on each side of the spindle motor 25 of the table driving apparatus 21, with the second optical head apparatus 81 being attached on an optical head attaching member 89. The guide shaft 84 is formed of a cylindrical member whose outer circumferential surface is smooth. The feed screw 86 doubles as the rotational shaft of a feed motor (electric motor) 87 that is the driving source, and is rotationally driven directly by the feed motor 87. The feed screw 86 is formed by providing a double screw thread that extends in a spiral across approximately the entire length in the axial direction of the outer circumferential surface of a round bar that is slightly shorter than the pair of guide shafts 32*a*, 32*b*. The screw thread in the feed screw 86 should favorably be formed with a trapezoidal cross-section where both side surfaces of the thread are angled slightly, though a square thread that is square in cross-section may also be used. A semicircular screw thread with a semicircular cross-section may also be used, as may any other conventional form of screw thread. In the present embodiment, the feed screw 86 is formed as a right-hand screw, though it should be obvious that a left-hand screw may be used.

The second optical head apparatus 81 is composed of a biaxial actuator, which includes an objective lens 82, and an optical control unit, which includes a photoelectric conversion element or the like and a laser diode for recording and reproducing information signals, such as image data and audio data, via the biaxial actuator. The majority of the biaxial actuator is covered by a head cover 83, with the objective lens 82 of the second optical head apparatus 81 being exposed via an opening provided in the head cover 83. The objective lens 82 of the second optical head apparatus 81 faces an information recording surface of the optical disc mounted on the turntable 26.

The second optical head apparatus 81 is supported by the guide shaft 84 and the feed screw 86 so that the second optical head apparatus 81 can be moved towards and away from the turntable 26 by the feed motor 87 that drives the feed screw 86. This is to say, a nut 88 is attached to the second optical head apparatus 81, with the nut 88 being screwed onto the feed screw 86. A slide 92 that can slide on the guide shaft 84 is also attached to the second optical head apparatus 81. The second optical head apparatus 81 is connected to a flexible circuit board 91 that is used for reading the reproduction data, etc.

The optical head attaching member 89 is screwed onto the chassis 70 by screws 90a, 90b so as to be rotatable, so that the direction in which the second optical head apparatus 81 is moved by the linear driving means can be made parallel to a predetermined radial direction with respect to the rotational center axis of the turntable 26. The optical head attaching member 89 is provided with a parallel driving means that drives the optical head attaching member 89 with respect to the chassis 70 parallel to a predetermined radial direction for the rotational center axis of the turntable 26. By having the optical head attaching member 89 moved in parallel by parallel driving means, the direction in which the second optical head apparatus 81 is moved by the linear driving means can be adjusted so as to match a predetermined radial direction for the rotational center axis of the turntable 26.

Figure 3:
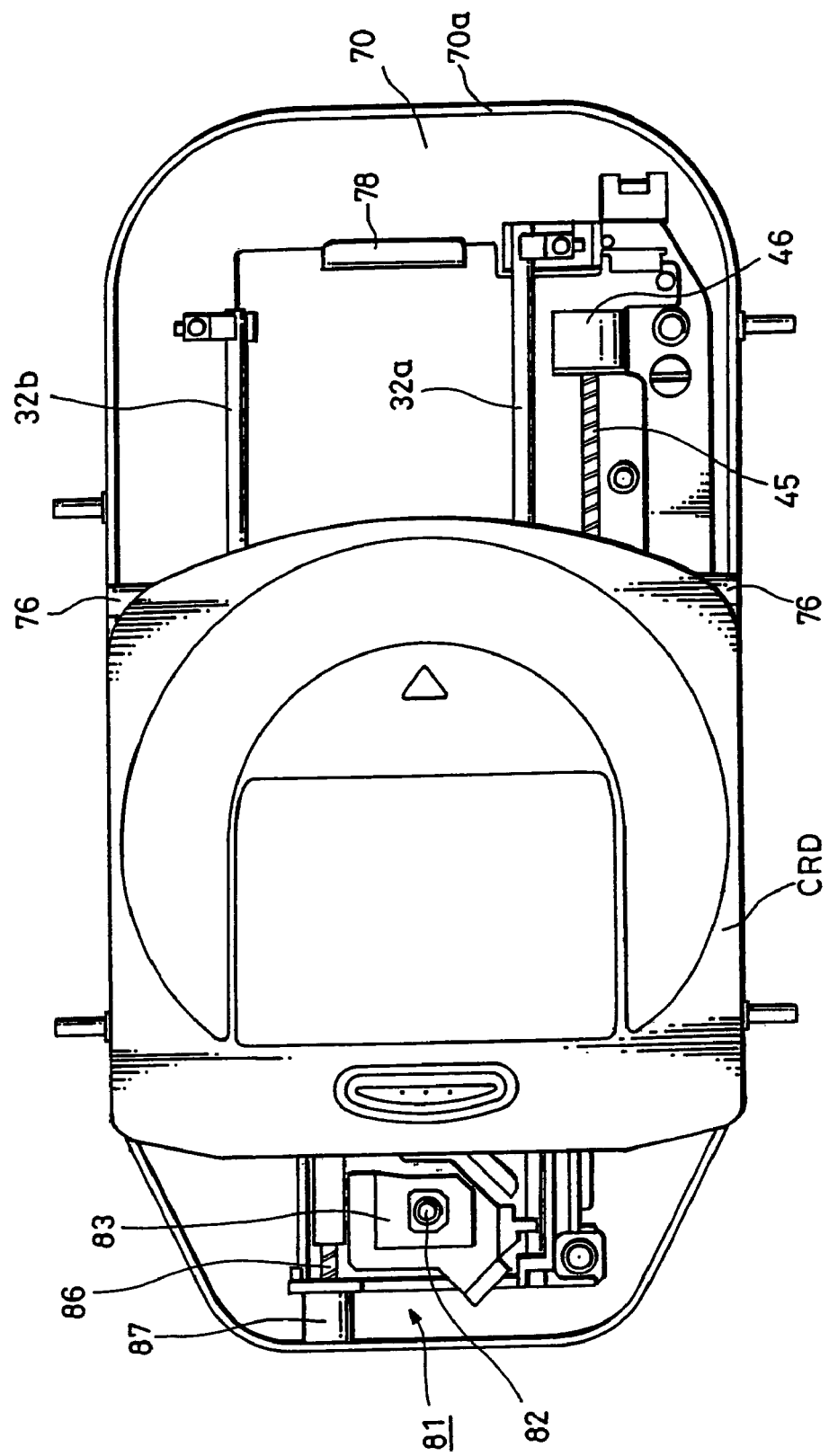
FIG. 3 is a plan view showing a state where a recording medium enclosed in a cartridge has been mounted on a turntable of a recording medium driving apparatus according to an embodiment of the present invention.

FIG. 3 shows a state where an optical disc enclosed in a cartridge CRD has been mounted on the turntable 26 of the optical disc driving apparatus shown in FIGS. 1 and 2. In this case, the second optical head apparatus 81 is in a withdrawn position, and the first optical head apparatus 22 that is not illustrated in FIG. 3 accesses the recordable optical disc enclosed in the cartridge CRD. It should be noted that one example of the construction of the cartridge in which the optical disc is enclosed is described later with reference to FIGS. 5 and 6.

Figure 4:
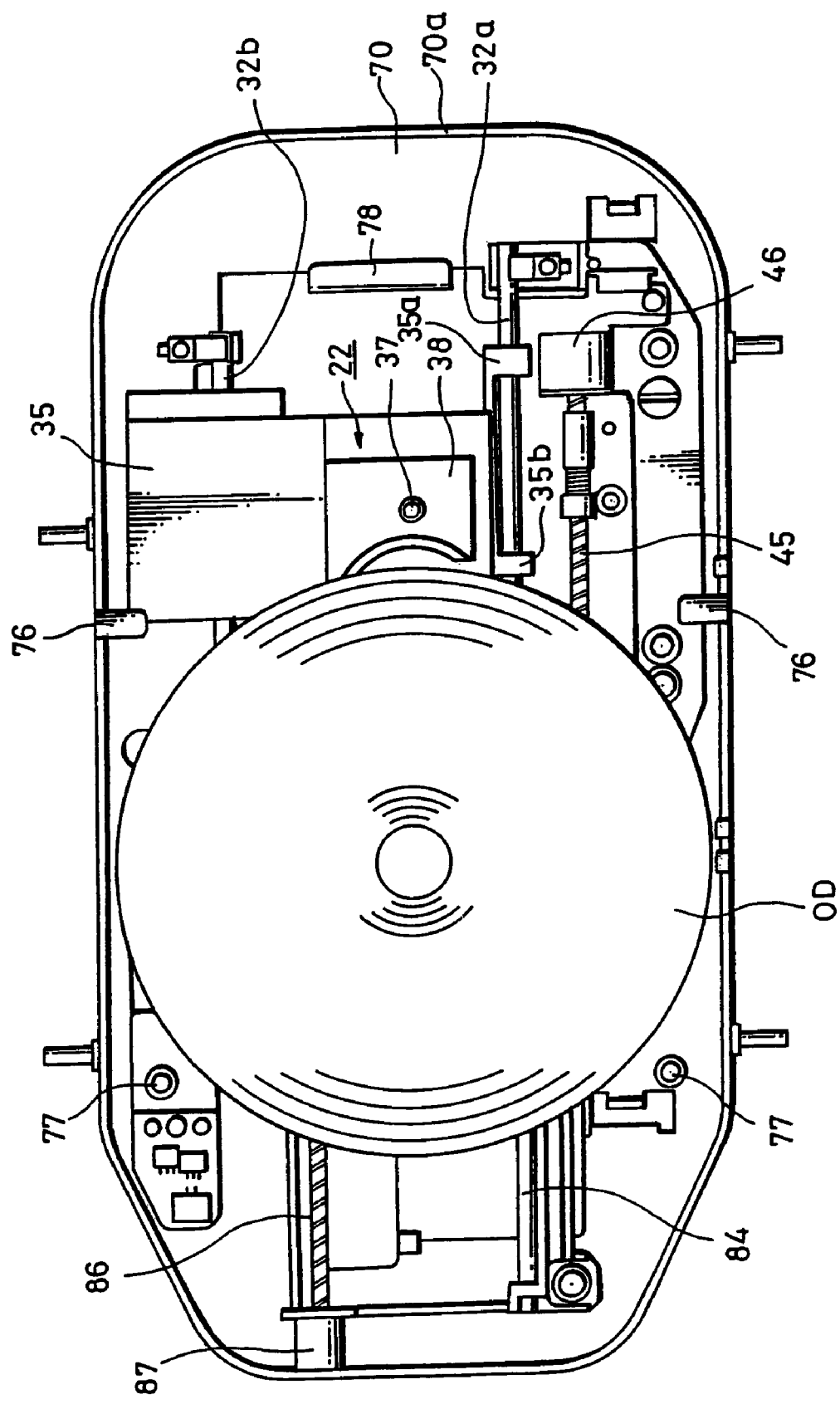
FIG. 4 is a plan view showing a state where a recording medium has been mounted on a turntable of a recording medium driving apparatus according to an embodiment of the present invention.

FIG. 4 shows a state where an exposed optical disc OD has been mounted on the turntable 26 of the optical disc driving apparatus shown in FIGS. 1 and 2. In this case, the first optical head apparatus 22 is in a withdrawn position and the second optical head apparatus 81 that is not illustrated in FIG. 4 accesses the optical disc OD. This optical disc OD is a CD or a DVD, as mentioned above.

The recording medium driving apparatus (optical disc driving apparatus) described above has a single shared turntable but is provided with separate optical head apparatuses (each with a separate linear driving means) that are compatible with recording media of a plurality (for example, two) of different types of recording formats. The recording medium driving apparatus (optical disc driving apparatus) is constructed so that when a recording medium with a format that one of the optical head apparatuses is compatible with is accessed, at least the head part (objective lens) of the other optical head apparatus can be withdrawn from the reflection area of that recording medium. This means that when one of the optical head apparatuses is accessing a recording medium with a compatible format, the other optical head apparatus can be prevented from interfering. There is a decrease in the number of parts, and no space or mechanism is required for moving the other optical head apparatus in the thickness direction, so that a slimline recording medium driving apparatus (optical disc driving apparatus) can be produced.

Figure 5:
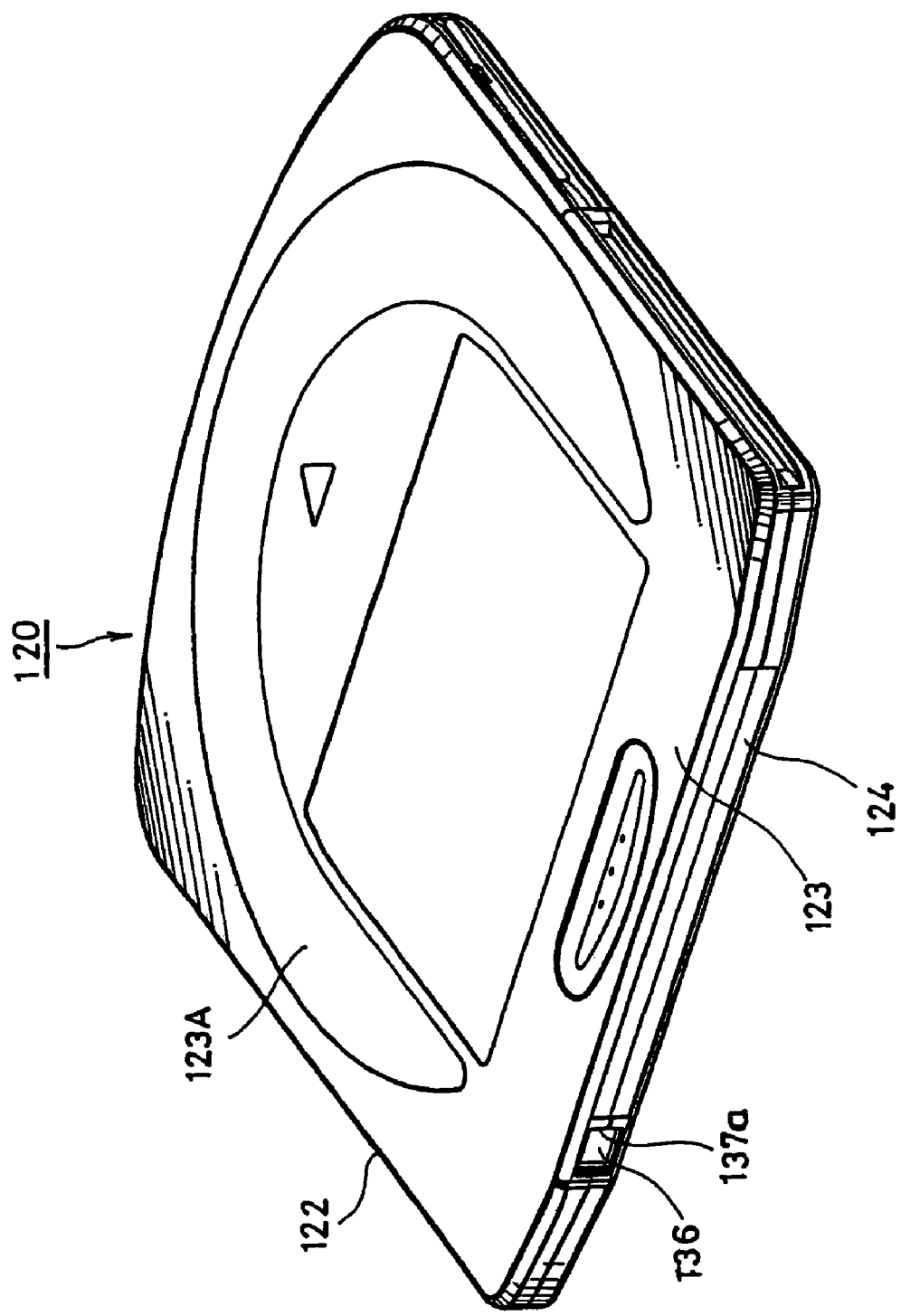
FIG. 5 is a perspective view showing the external appearance of the front of a cartridge in which a recording medium is enclosed.

Next, one example of the construction of the cartridge CRD in which the optical disc is enclosed as shown in FIG. 3 will be described with reference to FIGS. 5 and 6. FIG. 5 is a perspective view showing the external appearance of the front side of the cartridge in which the optical disc is enclosed, and FIG. 6 is a perspective view showing the external appearance of the rear side of the cartridge.

Figure 6:
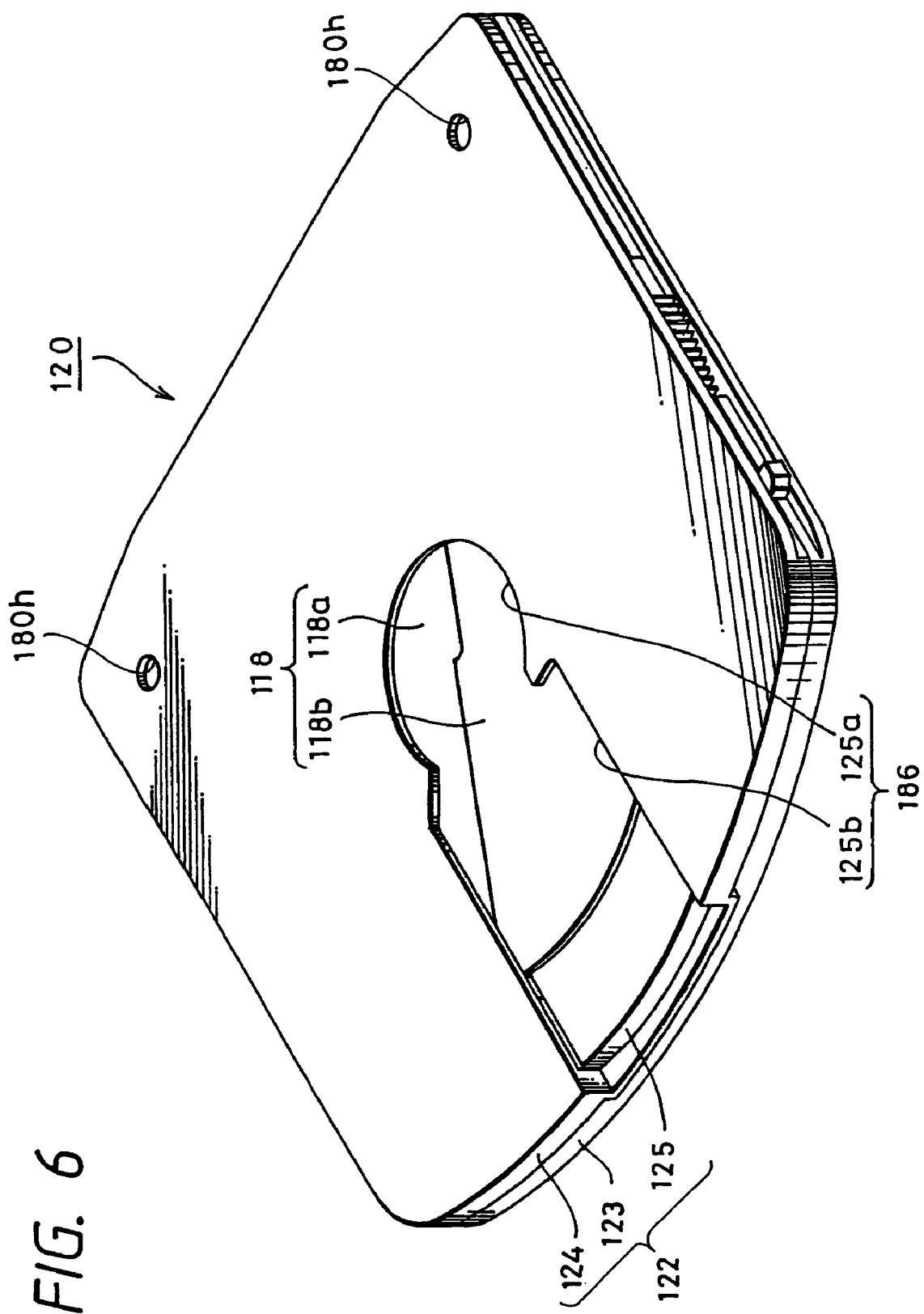
FIG. 6 is a perspective view showing the external appearance of the rear of a cartridge in which a recording medium is enclosed.

In FIGS. 5 and 6, reference numeral 120 denotes a cartridge-housed optical disc. Reference numeral 122 denotes a cartridge case, which is composed of an upper shell 123, a lower shell 124, and a middle shell 125. The optical disc is enclosed within a disc enclosure inside the cartridge case 122 so as to be freely rotatable.

As shown in FIG. 5, the upper shell 123 is formed of two colors using ABS resins of two colors. This is to say, a C-shaped transparent window 123A is formed of clear transparent ABS resin, while the remaining part is formed of ABS resin of a suitable resin. The label surface (not shown in the drawing) of the optical disc in the disc enclosure can be seen through this transparent window 123A.

In FIG. 5, reference numeral 136 denotes a mistaken deletion prevention tag, with this mistaken deletion prevention tag 136 being provided in a prevention tag enclosure and this prevention tag enclosure having an operating window 137a that is open on the reverse surface of the cartridge case 122. The mistaken deletion prevention tag 136 is attached so as to be able to slide to open and close this operating window 137 a.

As shown in FIG. 6, an opening 186 in the lower shell 124 is composed of a table opening 125a that is set in the center and into which the turntable 26 can be inserted and a head opening 125b that extends on both sides in the front and back direction of the table opening 125a. The opening 186 faces the information recording surface of the optical disc.

In FIG. 6, reference numeral 118 denotes a shutter mechanism which is composed of a pair of shutter members 118b, 118b. Round holes 180h, 180h are provided in two corners of the lower shell 124. When the cartridge-housed optical disc 120 is mounted on the turntable 26 of the optical disc driving apparatus, these holes 180h, 180h engage cartridge supporting pins 77, 77 of the optical disc driving apparatus of FIGS. 1 and 2 to position the cartridge-housed optical disc 120. It should be noted that when the cartridge-housed optical disc 120 is mounted on the turntable 26 of the optical disc driving apparatus, the surface of the lower shell 124 contacts the bent parts of the cartridge supporting members 76, 76 that are L-shaped in cross-section and are integrally formed with the reinforcing rib 70a of the chassis 70 of the optical disc driving apparatus. The cartridge-housed optical disc 120 is supported by the cartridge supporting pins 77, 77 and cartridge supporting members 76, 76.

Figure 7:
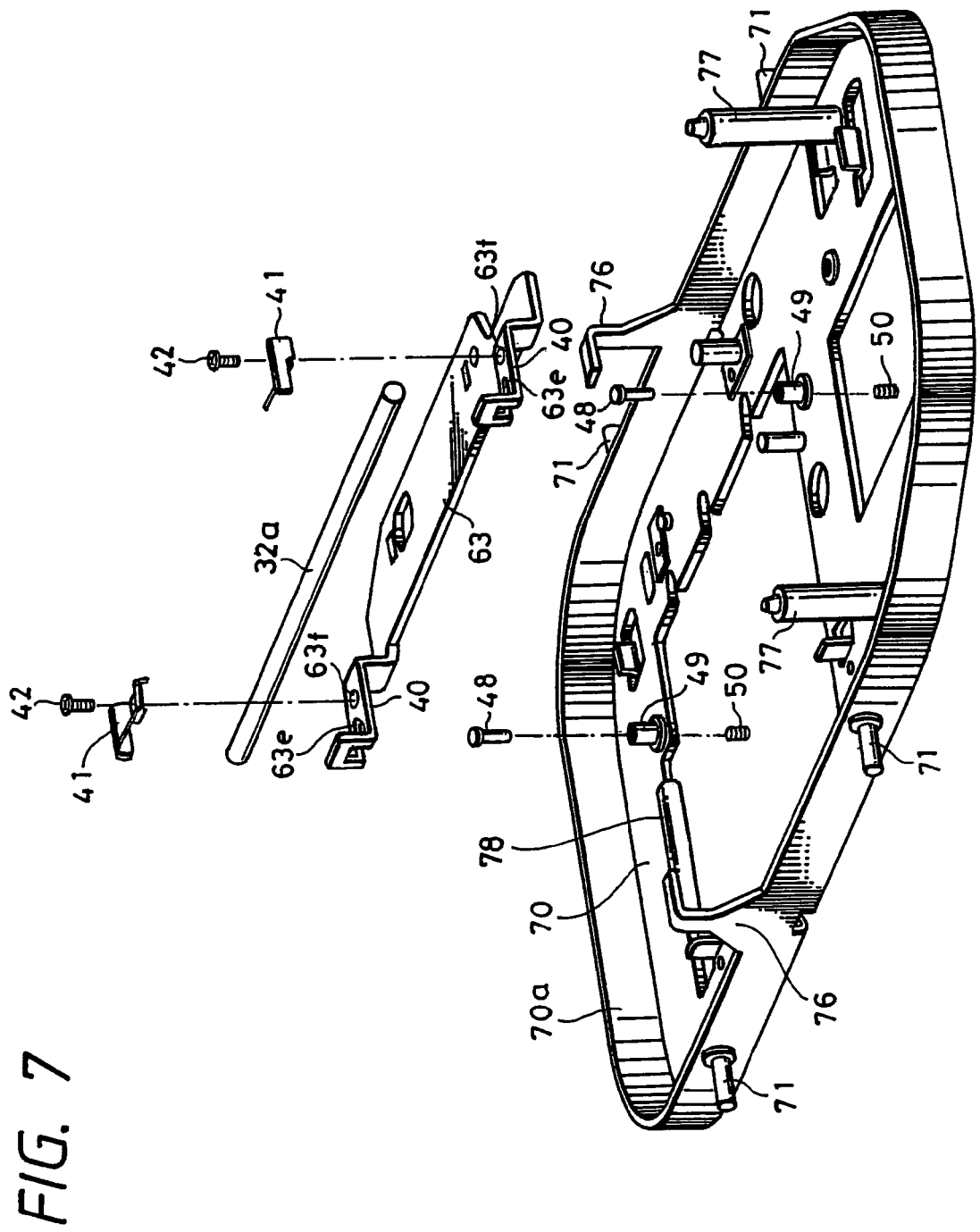
FIG. 7 is an exploded perspective view showing a main guide shaft, parts related to the main guide shaft, and a chassis in the recording medium driving apparatus shown in FIGS. 1 and 2.
Figure 8:
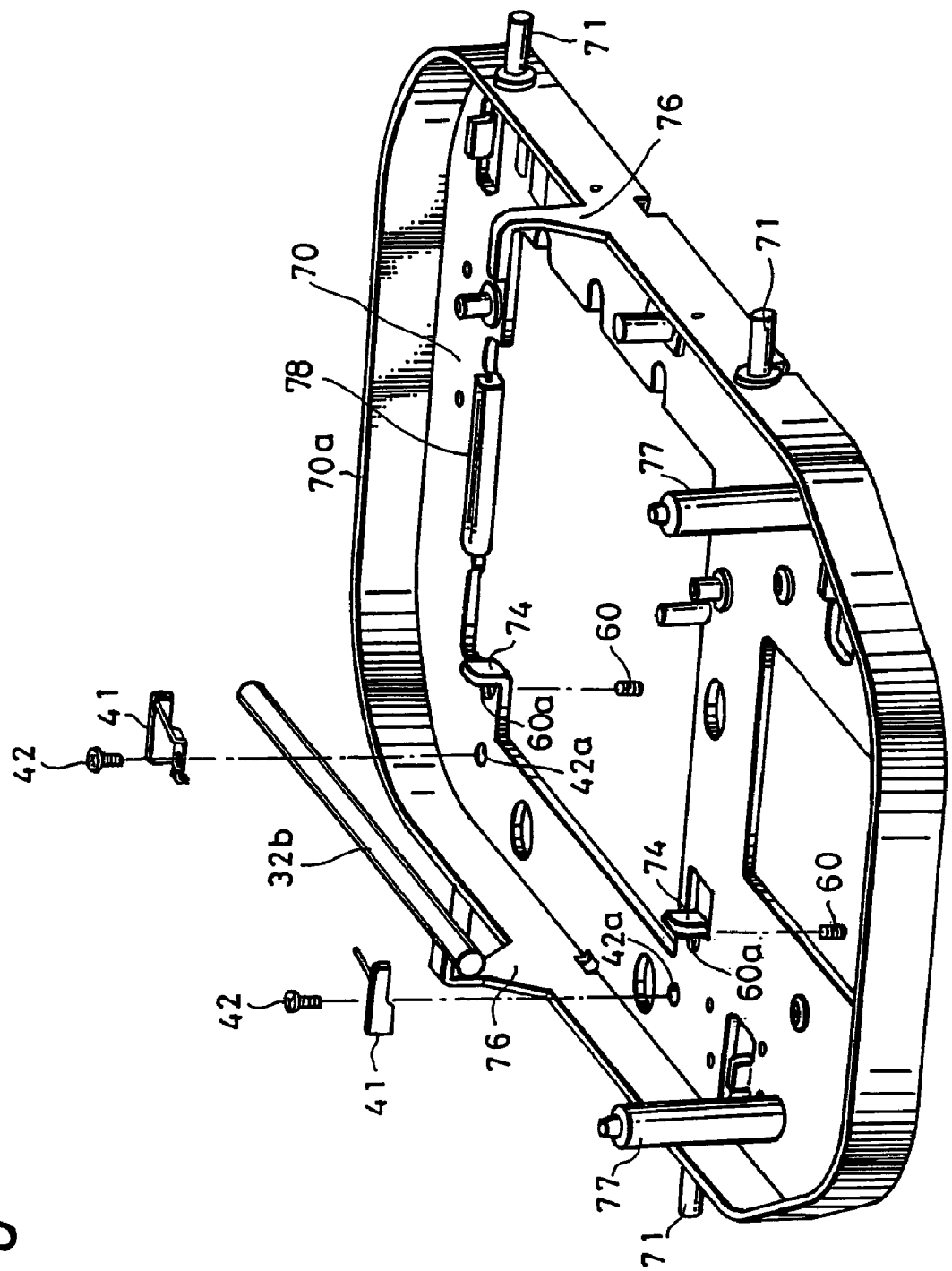
FIG. 8 is an exploded perspective view showing a sub guide shaft, parts related to the sub guide shaft, and a chassis in the recording medium driving apparatus shown in FIGS. 1 and 2.
Figure 9:
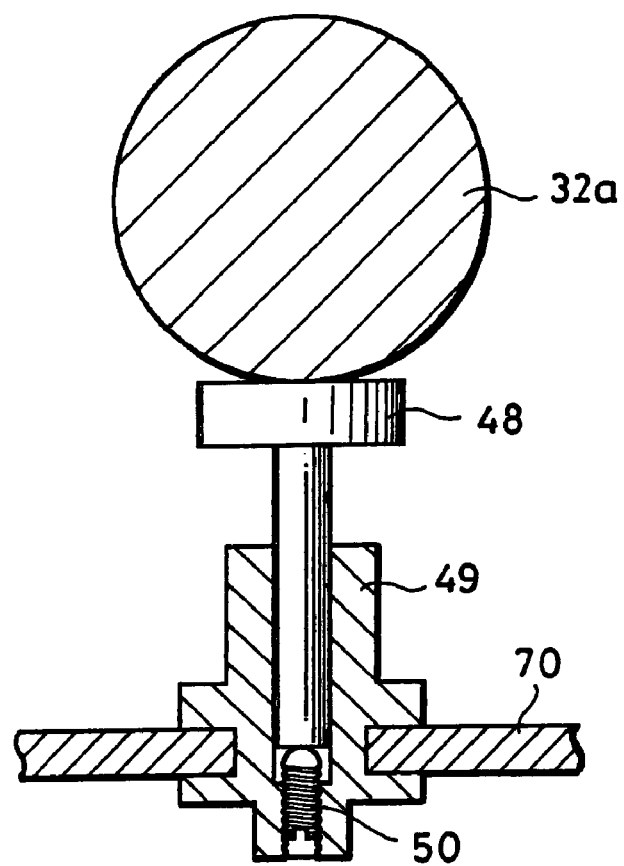
FIG. 9 is a cross-sectional drawing showing the main guide shaft of FIG. 7 and some of the related parts.
Figure 10:
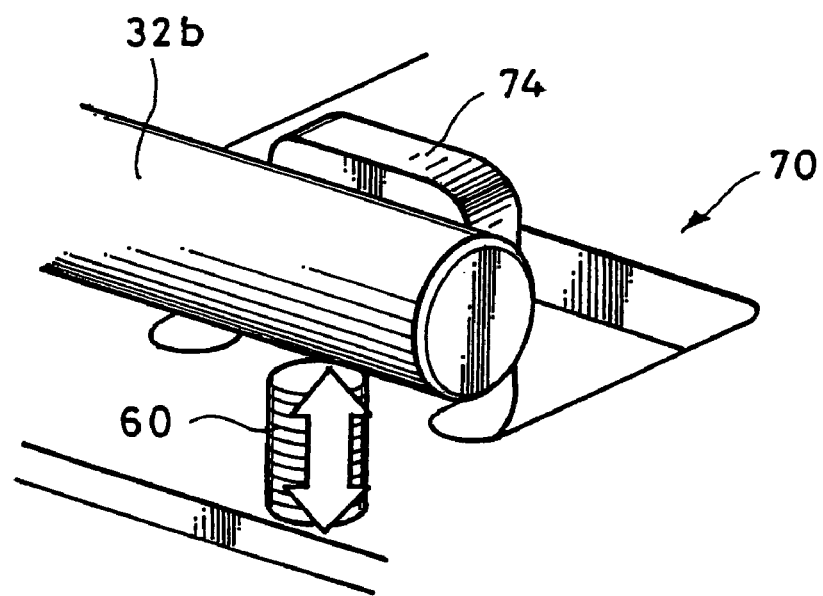
FIG. 10 is a perspective view showing the sub guide shaft of FIG. 8 and some of the related parts.

The following describes, with reference to FIGS. 1, 2, 7, 8, 9, and 10, the means for adjusting the heights and tilt of the main guide shaft 32a and the sub guide shaft 32b. FIG. 7 is an exploded perspective view showing the main parts that are related to the main guide shaft 32a, while FIG. 8 is an exploded perspective view showing the main parts that are related to the sub guide shaft 32b. FIG. 9 is a cross-sectional view showing the means for adjusting the height of the main guide shaft 32a in detail. FIG. 10 is a perspective view showing the means for adjusting the height of the sub guide shaft 32b in detail.

The following describes the parts related to the main guide shaft 32a, with reference to FIGS. 1, 2, 7, and 9. Both ends of the main guide shaft 32a are attached to the pair of shaft support plates 40, 40 of the rotating plate 63 by the shaft pressing plates (plate springs) 41 and the fixing screws 42, 42 that are screwed onto the female screw threads 63f, 63f that are formed in the shaft support plates 40, 40. The heads of the shafts 48, 48, that are T-shaped in cross-section, pass through the holes 63e, 63e provided in the shaft support plates 40, 40 and are abutted to both ends of the main guide shaft 32a from below as connectors. These shafts 48, 48 are fitted into sleeves that are planted in the chassis 70. Feed screws 50, 50 are screwed into base parts of the sleeves 49, 49, so that the height of shafts 48, 48 can adjusted by adjusting these feed screws 50, 50, which makes it possible to adjust the height of both ends of the main guide shaft 32a and the tilt of the main guide shaft 32a.

The following describes the parts related to the sub guide shaft 32b with reference to FIGS. 1, 2, 8, and 10. Both ends of the sub guide shaft 32b are supported by the shaft support plates 74, 74 provided on the chassis 70, the pair of shaft pressing plates (plate springs) 41, 41, and the pair of fixing screws 42, 42. The shaft suspending plates 74, 74 are formed by cutting and raising parts of the chassis 70, and by screwing the shaft pressing plates 41, 41 directly onto the chassis 70 with the screws 42, 42, the sub guide shaft 32b is positioned and fixed at a predetermined position of the chassis 70. Reference numerals 42a, 42a denote female screw threads that are provided in the chassis 70 and into which the fixing screws 42, 42 are screwed. Female screw threads 60a, 60a are also provided near the shaft support plates 74, 74, with feed screws 60, 60 being screwed into these female screw threads 60a, 60a from below the chassis 70 as connectors. The feed screws 60, 60 contact both ends of the sub guide shaft 32b from below, and by rotating the feed screws 60, 60, the heights of both ends of the sub guide shaft 32b and the tilt of the sub guide shaft 32b are adjusted.

Figure 11:
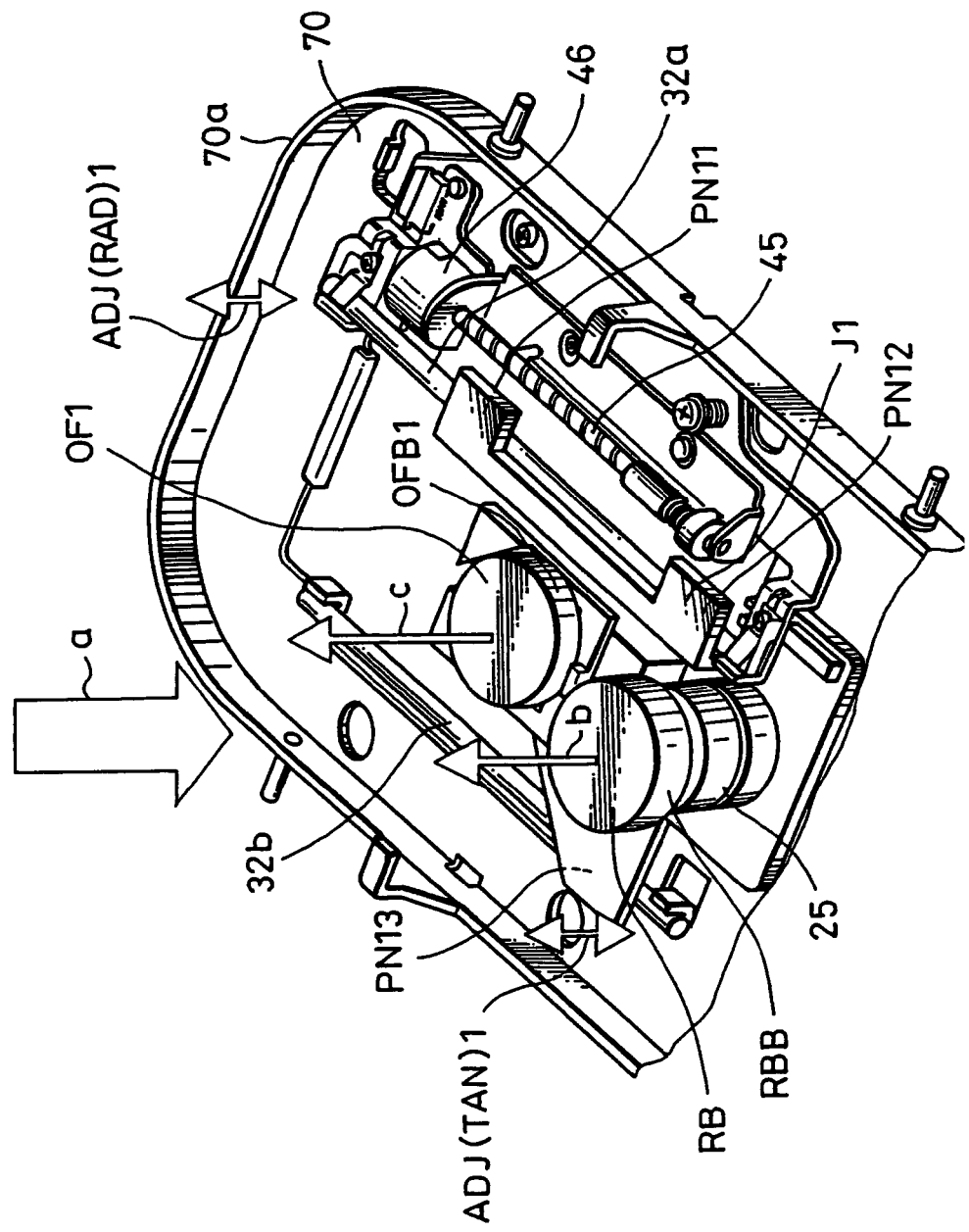
FIG. 11 is a perspective view showing a part of a recording medium driving apparatus in order to describe part of an embodiment of the present invention directed to a tilt adjusting method for guide shafts of a recording medium driving apparatus.
Figure 12:
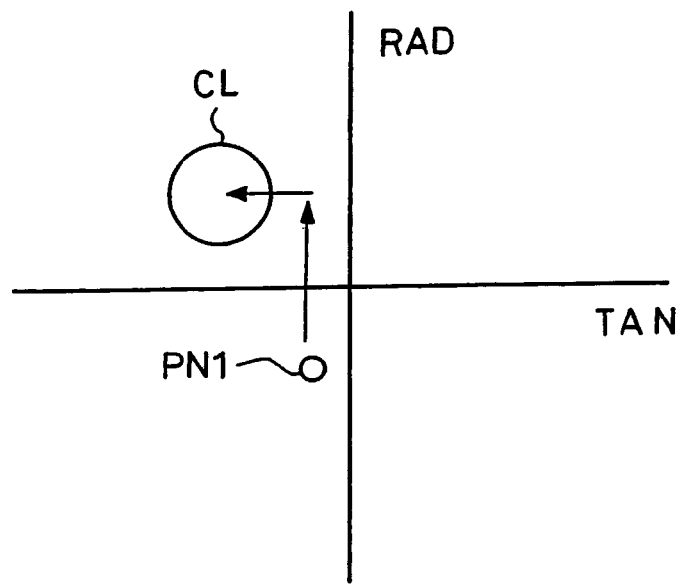
FIG. 12 shows a display screen of an auto-collimator in order to describe part of an embodiment of the present invention directed to a tilt adjusting method for guide shafts of a recording medium driving apparatus.
Figure 13:
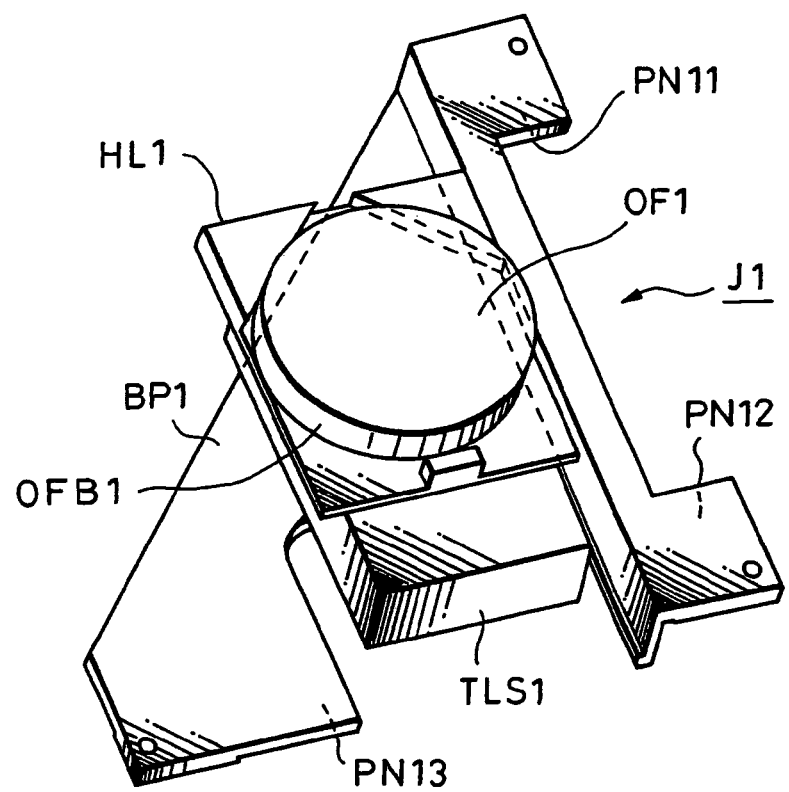
FIG. 13 is a perspective view showing a skew angle adjusting jig in order to describe part of an embodiment of the present invention directed to a tilt adjusting method for guide shafts in a recording medium driving apparatus.
Figure 14:
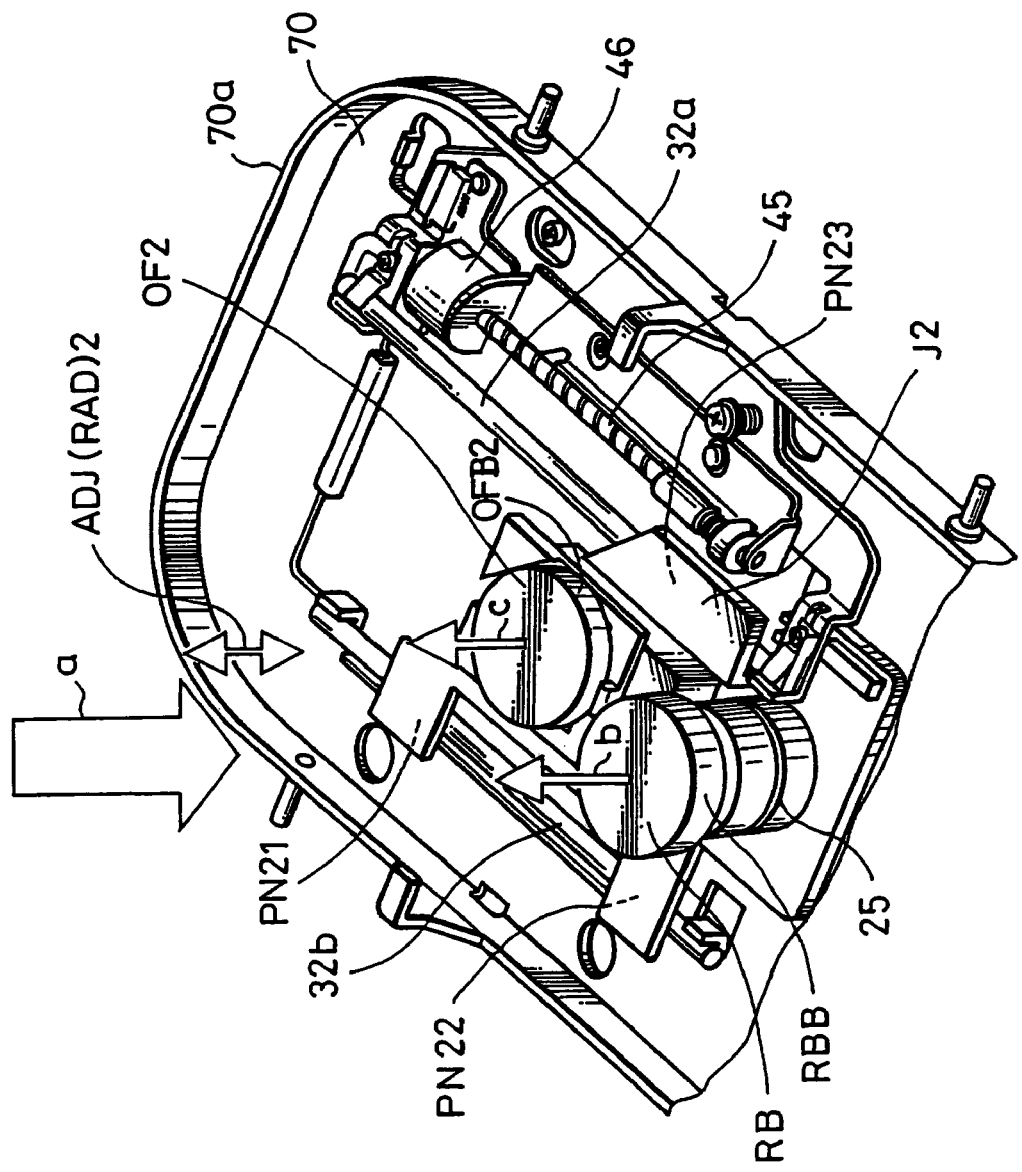
FIG. 14 is a perspective view showing a different part of a recording medium driving apparatus in order to describe part of an embodiment of the present invention directed to a tilt adjusting method for guide shafts of a recording medium driving apparatus.

The following describes, with reference to FIGS. 11 to 17, a method of adjusting the tilt of the guide shafts in the optical disc driving apparatus described above. As shown in FIGS. 11 and 14, a flat mirror, such as a circular flat mirror RB, is provided parallel to a surface of the turntable 26 that is driven by the spindle motor 25 and on which the optical disc is mounted. As one example, the turntable 26 can be covered by a reflective substrate RBB in the form of a cap.

Figure 15:
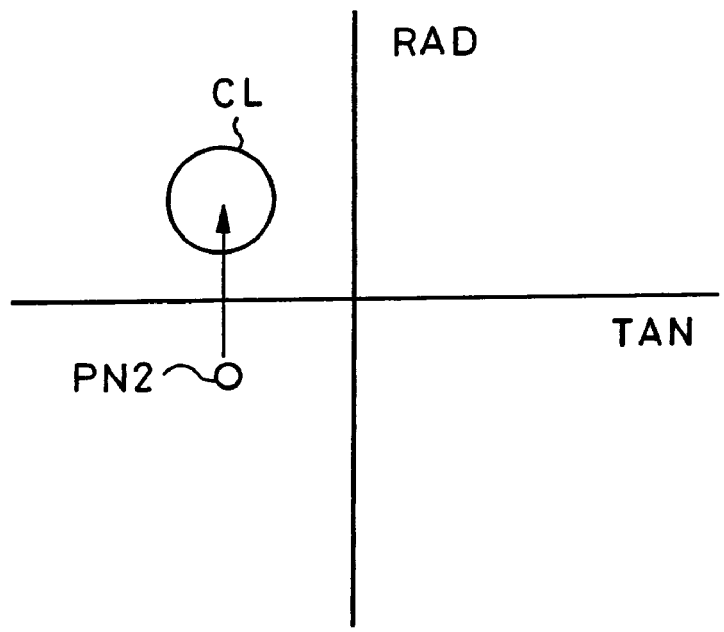
FIG. 15 shows a display screen of an auto-collimator in order to describe a different part of an embodiment of the present invention directed to a tilt adjusting method for guide shafts of a recording medium driving apparatus.
Figure 16:
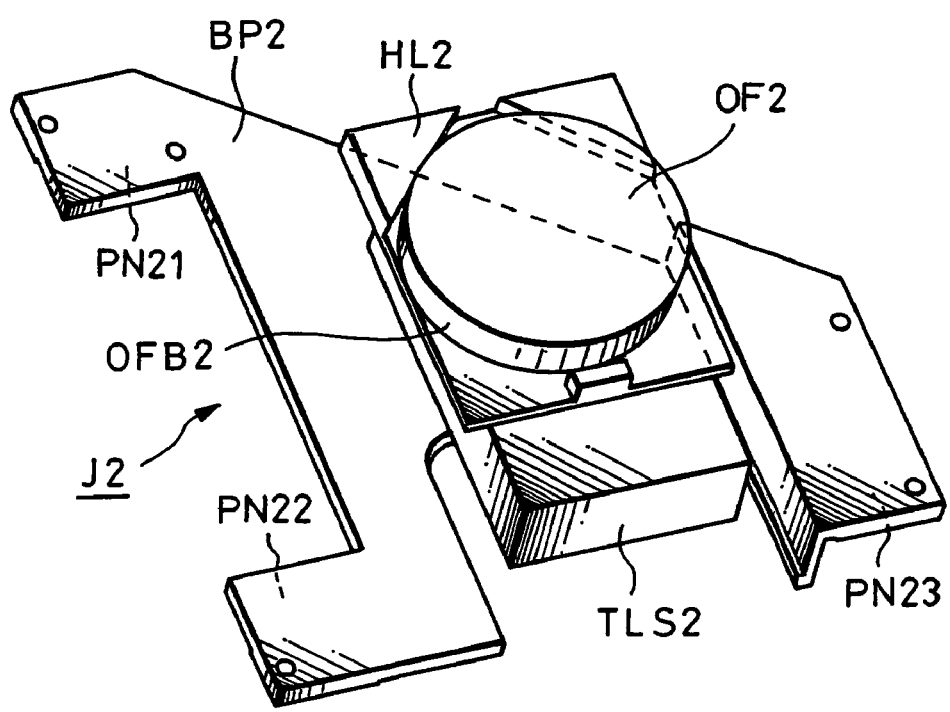
FIG. 16 is a perspective view showing a skew angle adjusting jig in order to describe a different part of an embodiment of the present invention directed to a tilt adjusting method for guide shafts in a recording medium driving apparatus.

As shown in FIG. 13, a circular optically flat surface OF1 is provided, for example. As one example, a skew angle adjusting jig J1 with a cap-shaped optically flat board OFB1 and three mounting surfaces PN11, PN12, PN13 that are parallel with the optically flat surface OF1 is used. As shown in FIG. 16, a circular optically flat surface OF2 may be provided, for example. As one example, a skew angle adjusting jig J2 with a cap-shaped optically flat board OFB2 and three mounting surfaces PN21, PN22, PN23 that are parallel with the optically flat surface OF2 may be used. An auto-collimator (not shown in the drawing) is also used. It should be noted that FIGS. 12 and 15 show display screens of this auto-collimator.

A single jig may be used as the jigs J1 and J2, but in the present embodiment, separate jigs J1, J2 are used as described with reference to FIGS. 13 and 16. In the jigs J1, J2, BP1, BP2 are the respective baseplates on which the optically flat boards OFB1, OFB2 are held and attached by holders HL1, HL2 . In the jigs J1, J2, reference numerals TLS1, TLS2 denote respective tilt stages for adjusting the tilt of the optically flat surfaces OF1, OF2 with respect to the respective baseplates BP1, BP2.

In the jig J1 in FIG. 13, PN11, PN12 are mounting surfaces that are mounted on both ends of the main guide shaft 32a, while PN13 is a mounting surface that is mounted on one end of the sub guide shaft 32b, with these being provided on the rear of the baseplate BP1 so as to be positioned at the vertices of a right-angled triangle on the outside of the optically flat board OFB1.

In the jig J2 in FIG. 16, PN21, PN22 are mounting surfaces that are mounted on both ends of the sub guide shaft 32b, while PN23 is a mounting surface that is mounted on one end of the main guide shaft 32a, with these being provided on the rear of the baseplate BP2 so as to be positioned at the vertices of a right-angled triangle on the outside of the optically flat board OFB2.

In the example of the optical disc driving apparatus shown in FIGS. 1 and 2, the main guide shaft 32a is located at a higher position than the sub guide shaft 32b with respect to the chassis 70, and in accordance with this, the mounting surface PN23 that is mounted on the main guide shaft 32a is provided at a higher position than the mounting surfaces PN21, PN22 that are mounted on the sub guide shaft 32b.

FIG. 12 shows the display screen of an auto-collimator that is used for the adjustment shown in FIG. 11. In FIG. 12, the legend "CL" denotes a circle that is the track produced by surface deviation of the light reflected off the flat mirror RB. PN1 denotes the spot of the light reflected off the optically flat surface OF1 of the jig J1.

First, the relative height of the turntable 26 and the first optical head apparatus 22 is adjusted in advance using jigs. Such adjustment is not the purpose of the present invention, and so is not described in detail in this specification.

Figure 17A:
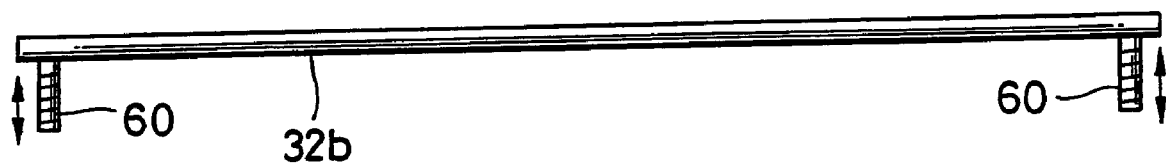
FIG. 17A is a side view showing one example of a height adjusting means for both ends of the sub guide shaft 32b.
Figure 17B:
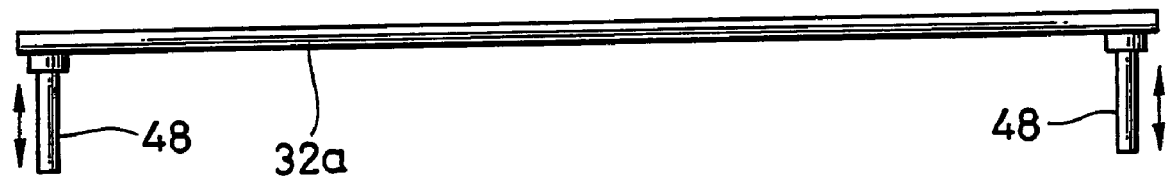

As shown in FIG. 11, two mounting surfaces PN11, PN12 out of the mounting surfaces PN11, PN12, PN13 of the jig J1 shown in FIG. 13 are mounted on both ends of the main guide shaft 32a and the remaining mounting surface PN13 is mounted on one end of the sub guide shaft 32b. A parallel beam from an auto-collimator (not shown in the drawing) positioned above the optical disc driving apparatus is perpendicularly shone onto the flat mirror RB that is rotated by the turntable 26 and the optically flat surface OF1 of the jig J1. The reflected light b reflected off the flat mirror RB and the reflected light c reflected off the optically flat surface OF1 return to the auto-collimator, and as shown in FIG. 12, the height of one end of the main guide shaft 32a is set as a standard and the height of the other end is adjusted by the shaft 48 as shown in FIG. 17B so that the tilt of the main guide shaft 32a in the radial direction is adjusted to match the tilt of the flat mirror RB (adjustment ADJ (RAD) 1 of the skew angle in the radial direction (RAD) of the main guide shaft 32a). After this, the height of the main guide shaft 32a is set as a standard and the height of one end of the sub guide shaft 32b (the end of the side on which the mounting surface PN13 of the jig J1 is mounted) is adjusted by adjusting the height of the feed screw 60 shown in FIG. 17A so that the tilt of the main guide shaft 32a in the tangential direction matches the tilt of the flat mirror RB (adjustment ADJ (TAN) 1 of the skew angle in the tangential direction (TAN) of the main guide shaft 32a. These adjustments refer to the movement of the spot PN1 to the center of the circle CL in FIG. 12.

FIG. 15 shows the display screen of an auto-collimator that is used for the adjustments shown in FIG. 14. In FIG. 15, the legend "CL" denotes a circle that is the track produced by surface deviation of the light reflected off the flat mirror RB. "PN2" denotes the spot of the light reflected off the optically flat surface OF2 of the jig J2.

As shown in FIG. 14, two mounting surfaces PN21, PN22 out of the mounting surfaces PN21, PN22, PN23 of the jig J2 shown in FIG. 16 are mounted on both ends of the sub guide shaft 32b and the remaining mounting surface PN23 is mounted on one end of the main guide shaft 32a. A parallel beam from an auto-collimator (not shown in the drawing) positioned above the optical disc driving apparatus is perpendicularly shone onto the flat mirror RB that is rotated by the turntable 26 and the optically flat surface OF2 of the jig J2. The reflected light b reflected off the flat mirror RB and the reflected light c reflected off the optically flat surface OF2 return to the auto-collimator, and as shown in FIG. 15, the height of one end of the sub guide shaft 32b (the end whose height is adjusted when adjusting the tilt of the main guide shaft 32a in the tangential direction) is set as a standard and the height of the other end is adjusted by the feed screw 60 shown in FIG. 17A so that the tilt of the sub guide shaft 32b in the radial direction is adjusted to match the tilt of the flat mirror RB (adjustment ADJ (RAD) 2 of the skew angle in the radial direction (RAD) of the sub guide shaft 32b). This adjustment refers to the movement of the spot PN2 to the center of the circle CL in FIG. 15.

As described above, using the jig J1, the tilt of the main guide shaft 32a in the radial direction is adjusted and then the tilt of the main guide shaft 32a in the tangential direction is adjusted. Next, using the jig J2, the tilt of the sub guide shaft 32b in the radial direction is adjusted. However, this order may be reversed. This is to say, the tilt of the sub guide shaft 32b may first be adjusted in the radial direction and the tilt of the sub guide shaft 32b then adjusted in the tangential direction using the jig J2, with the tilt of the main guide shaft 32a in the radial direction then being adjusted using the jig J1.

In the above embodiment, a case where the present invention is used in combination with an optical disc and an optical disc apparatus is described, though this is not a limitation for the present invention. It should be obvious that the present invention can be used in combination with a recording medium, such as a magnetic-optical disc, a magnetic disc, and a static storage disc, and a head apparatus that performs reproduction and/or recording for such a recording medium.

Also, the present invention is provided with a plurality of head apparatuses corresponding to plurality of types of recording media of different formats, so that the recording method can be selected from a variety of types. Also, this plurality of types of recording media may be a variety of types of exposed discs with different recording methods or a variety of types of discs that are enclosed in cartridges and have different recording methods.

The present invention provides a tilt adjusting method for a recording medium driving apparatus, the recording medium driving apparatus including at least a turntable for rotationally driving a recording medium that has been mounted, a spindle motor for driving the turntable, a head apparatus for performing recording and/or reproduction for the recording medium, and linear driving means for moving the head apparatus in a straight line, the linear driving means including at least a nut that is attached to the head apparatus, a feed screw onto which the nut is screwed, a feed motor for driving the feed screw, and first and second guide shafts that are disposed parallel to one another on both sides of the head apparatus and guide the head apparatus. The tilt adjusting method provides, on a surface of the turntable on which the recording medium is mounted, a reflective substrate including a flat mirror that is parallel with and above the surface, uses a skew angle adjusting jig and an auto-collimator, the skew angle adjusting jig including an optically flat substrate with an optically flat surface and three mounting surfaces that are parallel with the optically flat surface, and includes a first step and a second step. In a state where two mounting surfaces out of the three mounting surfaces of the skew angle adjusting jig are mounted onto both ends of the first guide shaft and a remaining mounting surface is mounted on one end of the second guide shaft, the first step (i) shines a parallel beam from the auto-collimator in a perpendicular state onto both the flat mirror, which is rotated by the turntable, and onto the optically flat surface, (ii) has reflected light from the flat mirror and reflected light from the optically flat surface return to the auto-collimator, (iii) adjusts, with a height of one end of the first guide shaft as a standard, a height of another end of the first guide shaft so that a tilt of the first guide shaft in the radial direction matches the tilt of the flat mirror, and (iv) next adjusts, with a height of the first guide shaft as a standard, a height of one end of the second guide shaft so that a tilt of the first guide shaft in the tangential direction matches the tilt of the flat mirror. In a state where two mounting surfaces out of the three mounting surfaces of the skew angle adjusting jig are mounted onto both ends of the second guide shaft and a remaining mounting surface is mounted on one end of the first guide shaft, the second step (i) shines a parallel beam from the auto-collimator in a perpendicular state onto both the flat mirror, which is rotated by the turntable, and onto the optically flat surface, (ii) has reflected light from the flat mirror and reflected light from the optically flat surface return to the auto-collimator, and (iii) adjusts, with a height of one end of the second guide shaft as a standard, a height of another end of the second guide shaft so that a tilt of the second shaft in the radial direction matches the tilt of the flat mirror.

| DESCRIPTION OF REFERENCE NUMERALS | |
| --- | --- |
| 32a | main guide shaft |
| 32b | sub guide shaft |
| RB | flat mirror |
| RBB | reflective substrate |
| J1 | jig |
| OF1 | optically flat surface |
| OFB1 | optically flat board |
| BP1 | baseplate |
| HL1 | holder |
| TLS1 | tilt stage |
| PN11~PN13 | mounting surface |
| J2 | jig |
| OF2 | optically flat surface |
| OFB2 | optically flat board |
| BP2 | baseplate |
| HL2 | holder |
| TLS2 | tilt stage |
| PN21~PN23 | mounting surface |

The invention claimed is:

1. A tilt adjusting method for a recording medium driving apparatus, the recording medium driving apparatus including at least a turntable for rotationally driving a recording medium that has been mounted, a spindle motor for driving the turntable, a head apparatus for performing recording and/or reproduction for the recording medium, and linear driving means for moving the head apparatus in a straight line, the linear driving means including at least a nut that is attached to the head apparatus, a feed screw onto which the nut is screwed, a feed motor for driving the feed screw, and first and second guide shafts that are disposed parallel to one another on both sides of the head apparatus and guide the head apparatus, the tilt adjusting method
(i) providing, on a surface of the turntable on which the recording medium is mounted, a reflective substrate including a flat mirror that is parallel with and above the surface,
(ii) using a skew angle adjusting jig and an auto-collimator, the skew angle adjusting jig including an optically flat substrate with an optically flat surface and three mounting surfaces that are parallel with the optically flat surface, and
(iii) comprising a first step and a second step, wherein in a state where two mounting surfaces out of the three mounting surfaces of the skew angle adjusting jig are mounted onto both ends of the first guide shaft and a remaining mounting surface is mounted on one end of the second guide shaft, the first step
shines a parallel beam from the auto-collimator in a perpendicular state onto both the flat mirror, which is rotated by the turntable, and onto the optically flat surface,
has reflected light from the flat mirror and reflected light from the optically flat surface return to the auto-collimator,
adjusts, with a height of one end of the first guide shaft as a standard, a height of another end of the first guide shaft so that a tilt of the first guide shaft in the a radial direction matches the tilt of the flat mirror, and
next adjusts, with the height of one end of the first guide shaft or an adjusted height of another end of the first guide shaft as a standard, a height of one end of the second guide shaft so that a tilt of the first guide shaft in a tangential direction matches the tilt of the flat mirror, and
in a state where two mounting surfaces out of the three mounting surfaces of the skew angle adjusting jig are mounted onto both ends of the second guide shaft and a remaining mounting surface is mounted on one end of the first guide shaft, the second step
shines a parallel beam from the auto-collimator in a perpendicular state onto both the flat mirror, which is rotated by the turntable, and onto the optically flat surface,
has reflected light from the flat mirror and reflected light from the optically flat surface return to the auto-collimator, and
adjusts, with an adjusted height of one end of the second guide shaft as a standard, a height of another end of the second guide shaft so that a tilt of the second shaft in a radial direction matches the tilt of the flat mirror.

2. A tilt adjusting method for a recording medium driving apparatus, the recording medium driving apparatus including a turntable for rotationally driving a recording medium, and a linear driving device configured to move a head apparatus and including first and second parallel guide shafts that are disposed on both sides of the head apparatus and are configured to guide the head apparatus, the tilt adjusting method comprising:

providing a flat mirror on a surface of the turntable and in parallel with the surface of the turntable;
providing an auto-collimator configured to shine parallel light beams therefrom and receive reflected light; and
providing a skew angle adjusting jig including an optically flat surface and three mounting surfaces that are parallel with the optically flat surface,
wherein parallel light beams from the auto-collimator are shined in a perpendicular state onto the flat mirror and the optically flat surface and reflected light received from the flat mirror and the optically flat surface,
wherein the skew angle adjusting jig is provided in a state where two of the three mounting surfaces are mounted onto first and second ends of the first guide shaft and a remaining mounting surface of the three mounting surfaces is mounted on a first end of the second guide shaft, a height of the second end of the first guide shaft is adjusted to equal a height of the first end of the first guide shaft so that a tilt of the first guide shaft in a radial direction matches a tilt of the flat mirror, and a height of the first end of the second guide shaft is adjusted to equal the height of the first end of the first guide shaft or an adjusted height of the second end of the first guide shaft so that a tilt of the first guide shaft in a tangential direction matches the tilt of the flat mirror, and
wherein the skew angle adjusting jig is provided in a state where two mounting surfaces out of the three mounting surfaces are mounted onto the first end and a second end of the second guide shaft and a remaining mounting surface is mounted on either the first end or the second end of the first guide shaft, and a height of the second end of the second guide shaft is adjusted to equal an adjusted height of the first end of the second guide shaft so that a tilt of the second shaft in a radial direction matches the tilt of the flat mirror.

3. The tilt adjusting method according to claim 2, wherein the first guide shaft is a main guide shaft and the second guide shaft is a sub guide shaft.

4. The tilt adjusting method according to claim 2, wherein the first guide shaft is a sub guide shaft and the second guide shaft is a main guide shaft.

5. The tilt adjusting method according to claim 2, wherein a first skew angle adjusting jig is used in the state where two of the three mounting surfaces are mounted onto the first and second ends of the first guide shaft and a remaining mounting surface of the three mounting surfaces is mounted on the first end of the second guide shaft, and a second skew angle adjusting jig is used in the state where two mounting surfaces out of the three mounting surfaces are mounted onto the first end and the second end of the second guide shaft and a remaining mounting surface is mounted on either the first end or the second end of the first guide shaft.

6. The tilt adjusting method according to claim 5, wherein the first skew angle adjusting jig is different from the second skew angle adjusting jig.

7. The tilt adjusting method according to claim 2, wherein the skew angle adjusting jig includes a base plate on which an optically flat board is attached by holders, the optically flat surface being provided on the optically flat board.

8. The tilt adjusting method according to claim 7, wherein the skew angle adjusting jig further includes a tilt stage configured to adjust the tilt of the optically flat surface with respect to the base plate.

9. The tilt adjusting method according to claim 7, wherein the three mounting surfaces are provided at vertices of a right-angled triangle on an outside of the optically flat board.

10. The tilt adjusting method according to claim 2, wherein the optically flat surface is circular in shape.

* * * * *